Aug. 30, 1966

L. J. BISHOP ETAL 3,269,520

TILTING TRAY SORTING CONVEYOR

Filed Dec. 2, 1964

INVENTORS
LEONARD J. BISHOP
& PAUL KLAMP
BY

*Barnes, Kisselle, Raisch & Choate*

ATTORNEYS

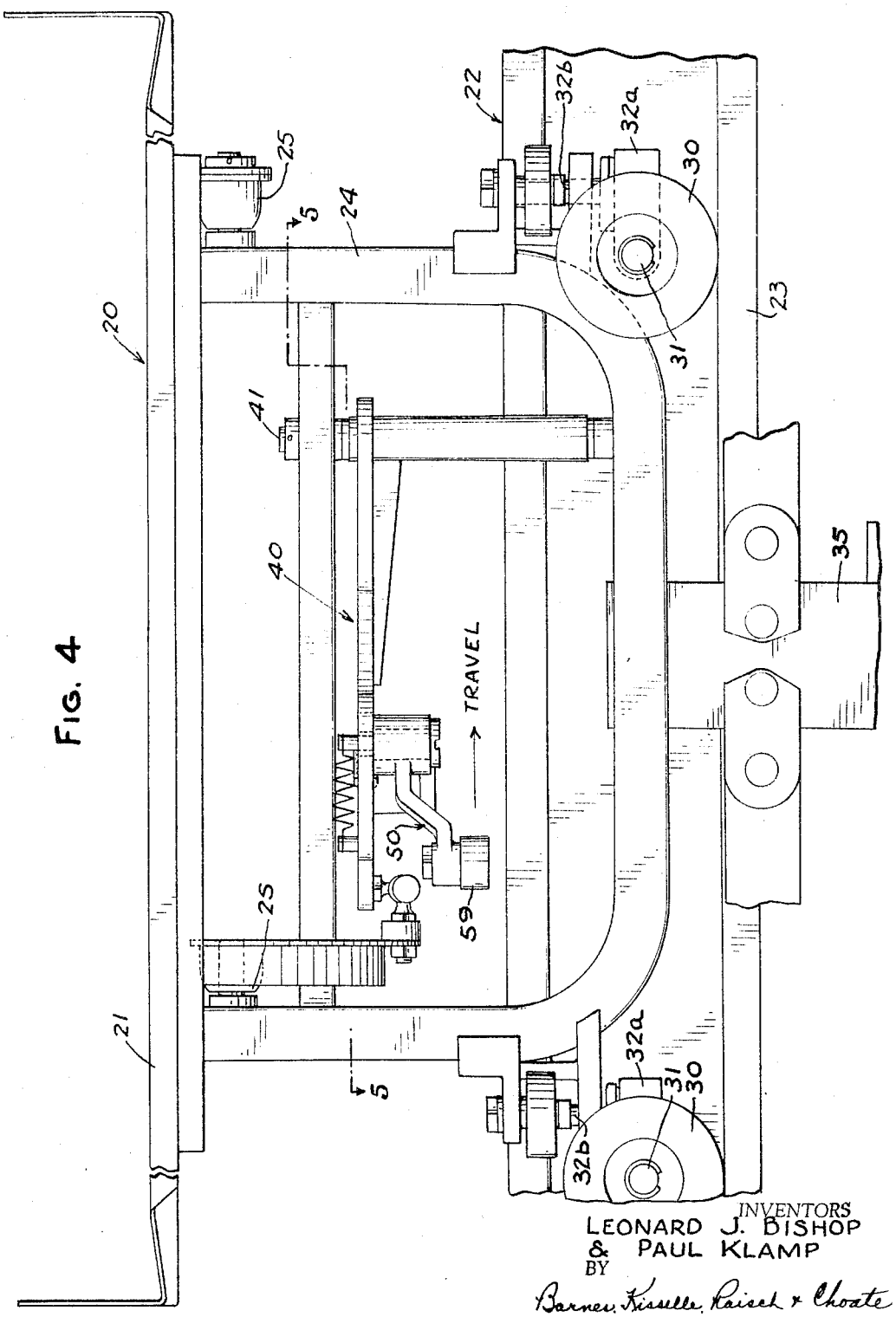

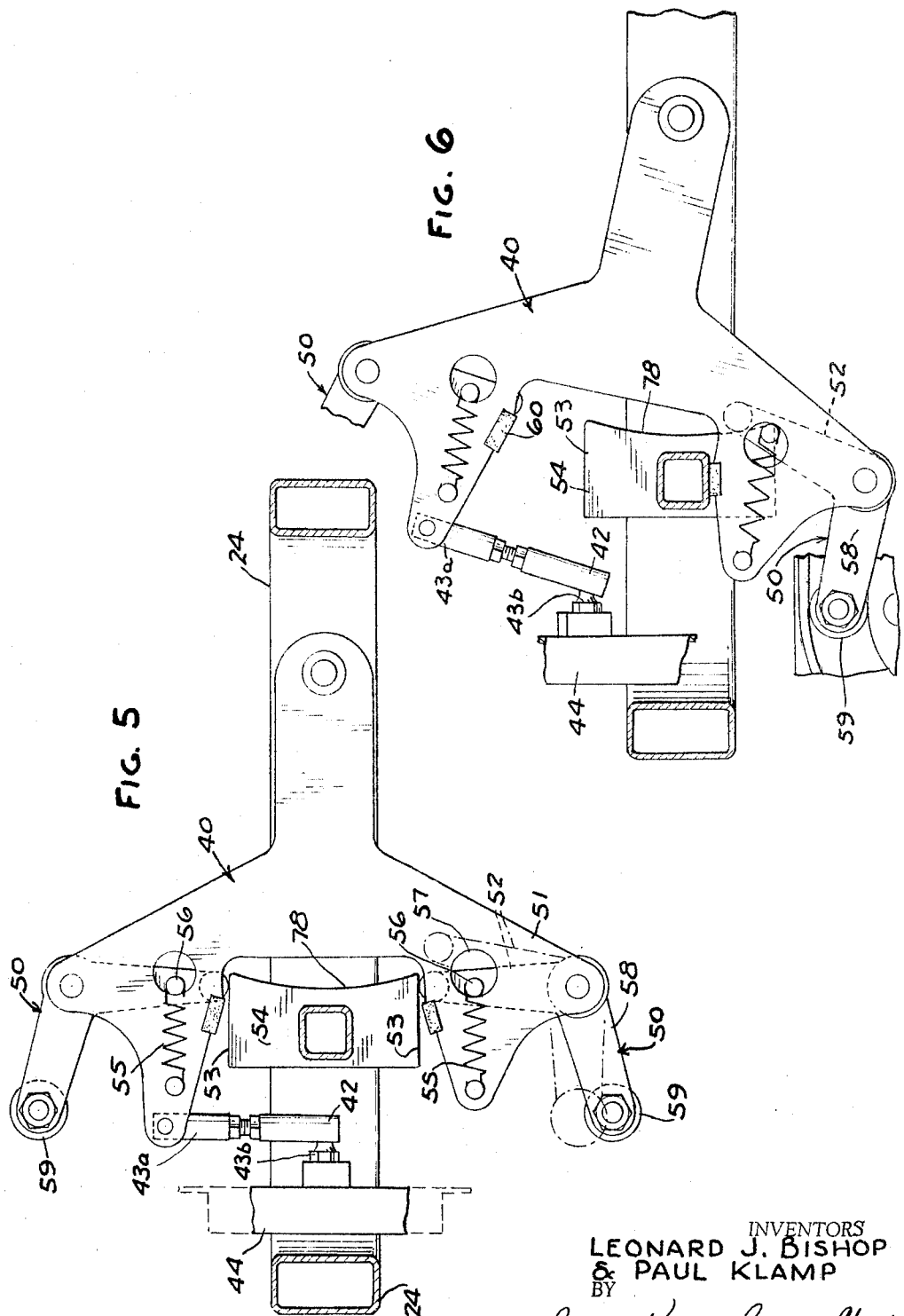

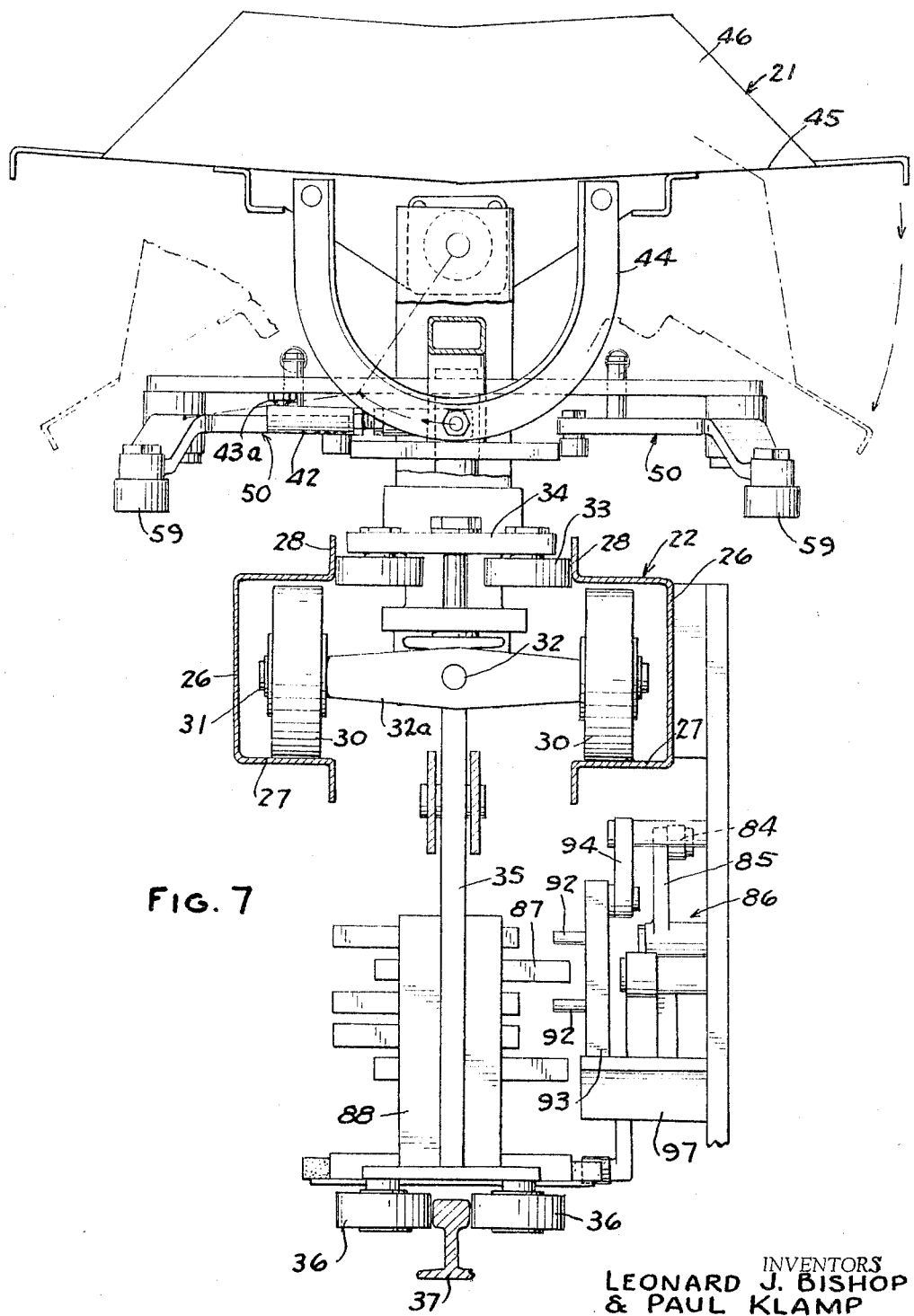

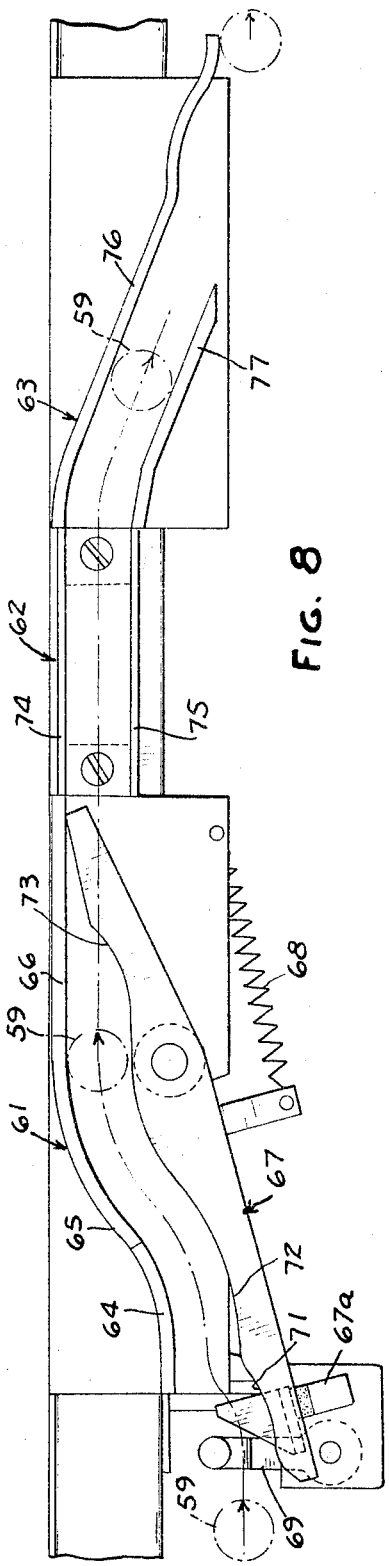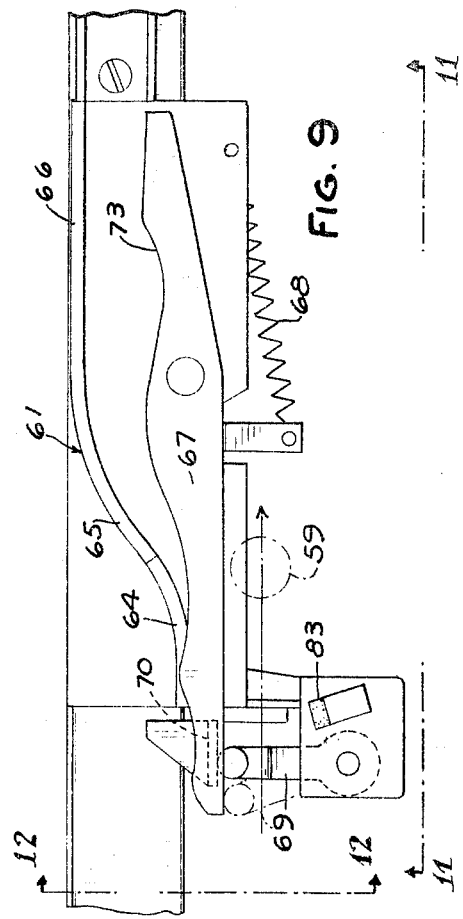

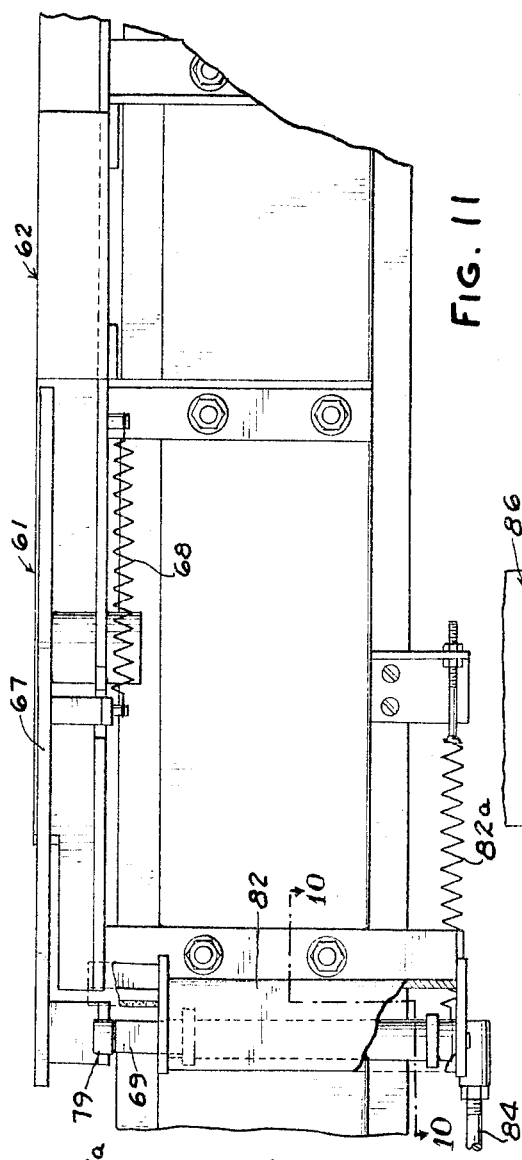

United States Patent Office  3,269,520
Patented August 30, 1966

3,269,520
TILTING TRAY SORTING CONVEYOR
Leonard J. Bishop, Birmingham, and Paul Klamp, St. Clair Shores, Mich., assignors to Mechanical Handling Systems, Inc., Warren, Mich., a corporation of Michigan
Filed Dec. 2, 1964, Ser. No. 415,445
19 Claims. (Cl. 198—155)

This invention relates to tilting tray conveyor systems and particularly to such conveyor systems which are adapted to move loads rapidly along a track and dump them as may be desired upon predetermined signal.

It is an object of this invention to provide a tilting tray sorting conveyor which will move loads at high speeds along a track and will dump the loads at predetermined locations in response to predetermined signals wherein the tilting motion is mechanically controlled throughout by means of a closed cam track, instead of being merely initiated by a tilting device and being completed by the inertia of the tray and load and by the action of gravity on the load.

It is a further object of the invention to provide such a tilting tray sorting conveyor system wherein trays are used to support the loads and wherein each tray can be tilted and reset to its level position at high speed with an absolute minimum of shock, bounce and wear.

It is a further object of the invention to provide such a tilting tray sorting conveyor system wherein the tilting and resetting motions take place with a gently accelerated start and an equally gently decelerated stop.

It is a further object of the invention to provide such a tilting tray conveyor system wherein the operating parts of the tilting system lie in a substantially single horizontal plane thereby facilitating the structure of the operating cams and associated parts.

It is a further object of the invention to provide such a tilting tray sorting conveyor system which is relatively simple and requires a minimum of maintenance.

It is a further object of the invention to provide such a tilting tray sorting conveyor system wherein said trays can be tilted or banked slightly on curves of the track to prevent the load from slipping off of the tray.

In the drawings:

FIG. 4 is a side elevational view on an enlarged scale of a portion of the system shown in FIG. 1.

FIG. 5 is a sectional view taken along the line 5—5 in FIG. 4.

FIG. 6 is a view similar to FIG. 5 showing the parts in a different operative position.

FIG. 7 is a view similar to FIG. 2 on an enlarged scale.

FIG. 8 is a fragmentary plan view on an enlarged scale of a portion of the apparatus shown in FIG. 1.

FIG. 9 is a view similar to FIG. 8 showing the parts in a different operative position.

FIG. 10 is a sectional view taken along the line 10—10 in FIG. 11.

FIG. 11 is a sectional view taken along the line 11—11 in FIG. 9.

FIG. 12 is a sectional view taken along the line 12—12 in FIG. 9.

FIG. 13 is a side elevational view of the signal portion of the apparatus.

Figure 1:
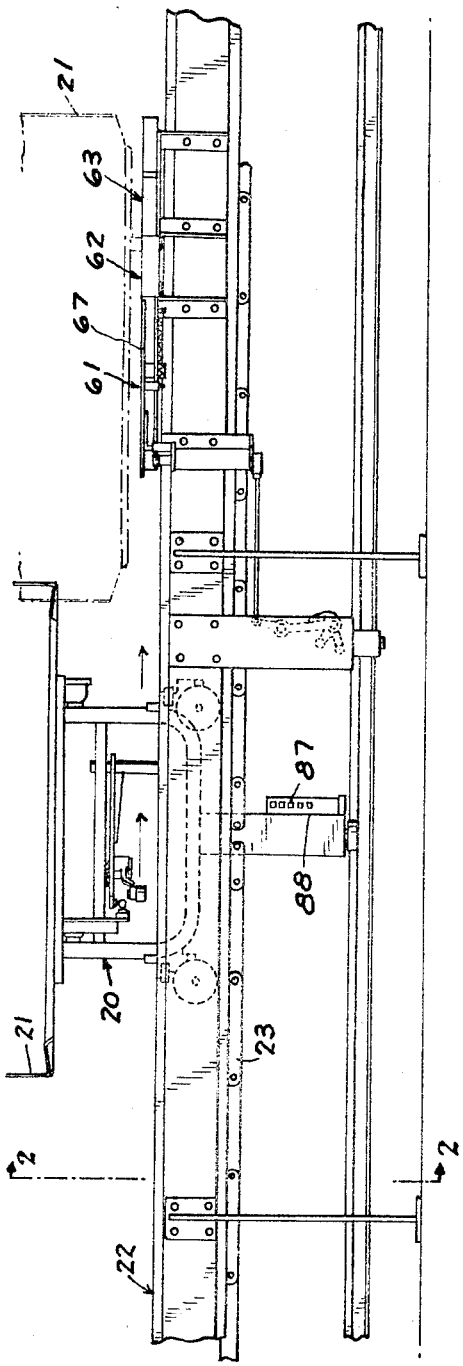
FIG. 1 is a fragmentary side elevational view of a tilting tray sorting conveyor system embodying the invention.
Figure 2:
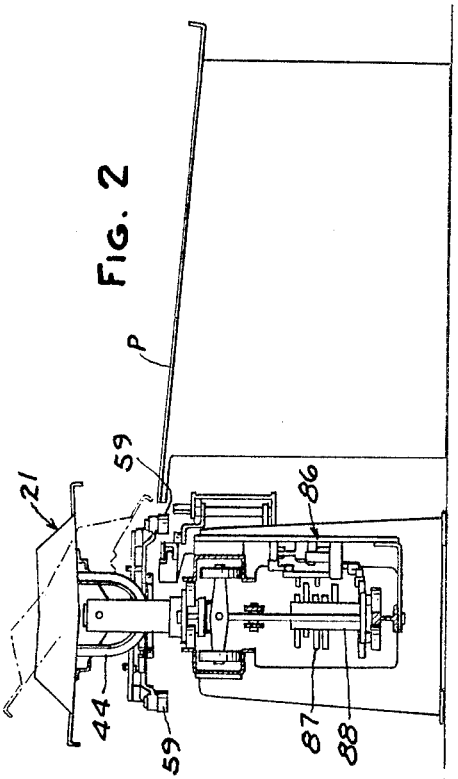
FIG. 2 is a sectional view taken along the line 2—2 in FIG. 1.

Referring to FIG. 1, a carrier 20 having a tilting tray 21 thereon comprises one of a plurality of carriers mounted on a track 22 and interconnected by a chain 23 which is driven to move the carrier along the track. At selected points, it is desirable to swing the tray to one side or the other of the track in order to selectively dump the load thereon onto a platform P (FIG. 2).

Referring to FIGS. 4 and 7, each carrier 20 comprises a frame 24 which is generally U-shaped with anti-friction ball type bearings 25 pivotally mounting the tray 21 thereon about an axis generally parallel to the direction of travel of the carrier 20 on the track 22. Pivot bearings 25 are on the same side of the extensions of frame 24 to facilitate removal of tray 20 if it is damaged.

As shown in FIG. 7, track 22 comprises a pair of spaced U-shaped panel members 26 facing inwardly toward one another with a leg 27 thereof extending horizontally and flanges 28 extending generally vertically. Each pair of supporting rollers 30 is mounted on axles 31 extending transversely from an axle housing 32a which is pivoted on a horizontal pin 32 which, in turn, is mounted in an integral head at the lower end of vertical shaft 32b. One shaft 32b is pivoted to the front and rear of the frame 24. By this arrangement, the rollers 30 can freely move around turns without drag on surfaces 27. Guide rollers 33 mounted on arms 34 fixed on the front or rear of the frame 24 contact the flanges 28 to guide the frame 24 laterally. A stabilizing member 35 is fixed to the lower end of the frame 24 and extends downwardly from the frame 24. Rollers 36 mounted for rotation about a generally vertical axis on the lower end of the stabilizing arm 34 engage the sides of a lower track member 37 to maintain the frame 24 in stable condition as the carrier frame 24 moves along the track 22.

The links of the chain 23 are pivoted to the stabilizing member 35 to permit the chain to pivot relative to the carrier as the carrier moves, for example, around a curved portion of the track 22. The chain 23 may comprise a standard forged rivetless link chain but preferably is a machined link chain to provide for most quiet operation.

Referring to FIGS. 4, 6 and 7, a tilting yoke 40 is pivoted on a vertical shaft 41 mounted on frame 24 for swinging movement in a horizontal plane. A rod 42 is connected at one end to yoke 40 through a ball connection 43a and at the other end to a U-shaped bracket 44 through a ball connection 43b, the bracket 44 extending vertically downwardly from the tray 21. As shown in FIG. 7, the base of the tray 45 slopes inwardly and has end flanges 46 tending to retain packages or loads on the tray.

Referring to FIGS. 5 and 6, in its normal position, tilting yoke 40 is positioned as shown in FIG. 5 generally symmetrically with respect to the axes of the carrier and maintains the tray 21 in generally horizontal position. When the tilting yoke 40 is pivoted, as presently described, it swings the bracket 44 and, in turn, the tray 21 to one side or the other of the frame 24 and track 22 to dump the load.

As shown in FIG. 5, a latch lever 50 is pivoted about a vertical axis to each of lateral projections 51 on tilting yoke 40. Each latch lever 50 includes an arm 52 extending inwardly and engaging the side 53 of a latch plate 54 to lock the tilting yoke 40 in its neutral non-tilting position. A tension spring 55 extends between the tilting yoke 40 and a pin 56 extending upwardly from the latch lever 50 through an opening 57 in the lateral projection 51.

Latch lever 50 includes a second arm 58 extending laterally outwardly and rearwardly from arm 52. Each arm 58 has a cam follower roller 59 thereon adapted to engage a cam track, as presently described, to swing the latch lever 50 to the dotted line position shown in FIG. 5, thereby moving the end of the arm 52 of the latch lever 50 away from surface 53 of latch plate 54 and bringing pin 56 into engagement with the edge of the opening 57 so that continued movement of the arm 59 inwardly swings the tilting yoke 40 horizontally to the position shown in FIG. 6. This, in turn, tilts the tray 21 through the link 42 to dump load thereon to one side of the conveyor. Similarly, the cam follower 59 on the other latch lever 50 on the other side of the tilting yoke 40 can be actuated by another cam to swing tilting yoke 40 in the opposite direction and tilt the tray 21 in the opposite direction.

Referring to FIGS. 8 and 9, the cam which is engaged by the cam follower 59 comprises a tilting portion 61, a running portion 62 that maintains the tray in tilted position for the desired interval of time and resetting portion 63 that returns the tilting tray to its horizontal position. The tilting cam 61 comprises an inner fixed cam having a first straight portion 64 which gradually curves at 65 into a second straight portion 66. The tilting cam 61 also includes a movable member 67 which defines on one surface thereof the other side of the cam. The cam member 67 is yieldingly urged by a spring 68 into a position wherein movement of cam follower 59 on latch lever 50 will cause the cam follower 59 to engage the cam member and thereby swing the latch lever 50 inwardly.

Normally, the cam member 67 is held out of position for engaging cam follower 59 by a latch 69 bearing against a fixed downwardly extending projection 70 in position such that the cam follower roller 59 will bypass the cam 61 (FIG. 9). If, however, a proper signal is provided, as presently described, the latch 69 is pivoted to the dotted line position shown in FIG. 9 permitting the spring 68 to swing the cam member 67 outwardly against stop 67a.

Cam member 67 includes a first curved surface 71 which engages the cam follower roller 59 and moves it inwardly sufficiently to swing the latch lever 50 and thereby disengage the end of the arm 52 from the surface 53 of the latch plate 54 (FIG. 5). Cam lever 67 includes a second surface 72 that cooperates with the surface of the portions 64, 65 and 66 to uniformly accelerate the cam follower inwardly and thereby smoothly pivot the yoke 40 to the position shown in FIG. 6 in order to tilt the tray. Further movement of the carrier causes the cam follower 59 to engage the resetting portion 73 of cam member 67 swinging the cam member 67 clockwise to the latched position shown in FIG. 9. When the cam member 67 is swung clockwise, the latch 69 is moved inwardly behind the projection 70 to lock the cam member 67 in the position shown in FIG. 9.

The intermediate portion 62 of the cam comprises spaced rails 74, 75 which can be of any length that may be desired to maintain the tray 21 in a tilted position. As the carrier continues to move, the cam follower roller 59 finally engages the return portion 63 of the cam which comprises spaced rails 76, 77 that swing the cam follower roller 59 back to the position shown in FIG. 5 and thereby latch the end of arm 52 with the surface 53.

During the swinging of the tray to a tilted position, the end of the lever 52 engages the concave surface 78 on the front side of the cam plate and thereby positively guides and controls the pivoting movement of the yoke 40 and, in turn, the tilting unit of the tray 21 (FIG. 6).

The curvatures of the cam surfaces are such as to produce a harmonic motion that quickly tilts the tray to and from tilting position with minimum shock, noise and wear.

The movement of the latch 69 (FIGS. 8 and 9) by a proper signal is achieved by the apparatus shown in FIGS. 13 and 14. As shown in FIGS. 11 and 12, the latch 69 having a roller 79 on the end thereof is mounted on a tube 80 which is journaled on a shaft 81 held by a bracket 82 mounted on one of the channels 26 of the track 22. An arm 82b is fixed to the lower end of the tube 80 and is yieldingly urged by the spring 82a against a rubber stop 83 on the bracket 82. A connecting link 84 extends from the arm 81 to the actuating lever 85 of a signal reader 86 mounted alongside of the track in position to be actuated by one of a plurality of signal pins 87 mounted on a signal box 88 which is fixed to the carrier.

As shown in FIGS. 7 and 13, signal reader 86 includes a bell crank pivoted on the lower end of lever 85. If the pins 87 are set in proper relation, then none of the pins 87 makes any contact with the signal reader and the master dog 90 engages a roller 89 on an intermediate bell crank 91 and swings the bell crank 91, clockwise as shown in FIG. 13 to operate the actuating lever 85. This, in turn, reciprocates the rod 84 and swings the latch 69 to permit the cam member 67 to move out into position to be engaged by the cam follower roller 59. If, however, any one of the signal pins 87 is not in proper order, indicating that the tray 21 should not to tilted, it will contact reader pins 92 on a bar 93 which is mounted by parallel arms 94, 95 on the signal reader. The lower arm 95 has an extension 96 so that when the arms 94, 95 are swung, clockwise as shown in FIG. 13, extension 96 engages a roller 91a on crank 91 and rotates the crank 91 so that the crank arm will not actuate the lever 85. The weight of arm 95 and arms 94, 95 normally urges the bar 93 against a stop 97.

Figure 3:
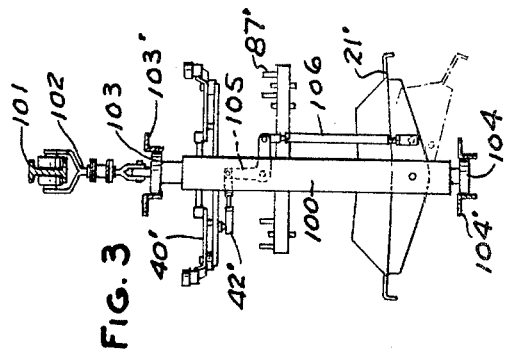
FIG. 3 is a fragmentary view similar to FIG. 2 of a modified form of the system.

In the arrangement shown in FIG. 3, the tray 21' is pivoted to a trolley frame 100, suspended from a track 101 by hangers 102 and guided by rollers 103, 104 on guides 103', 104'. The tilting loke 40' and associated mechanism are pivoted on frame 100. The yoke rod 42' is connected to a crank 105 which, in turn, is connected to the tray 21' by link 106. Frame 100 carries signal pins 87' which cooperate with a signal reader, not shown. The tilting mechanism is otherwise identical to that previously described and operates in a substantially similar fashion to tilt and reset tray 21'.

It can thus be seen that there has been provided a tilting tray conveyor system wherein the tilting motion is mechanically controlled throughout; wherein the tilting and resetting motions take place with a gently accelerated start and stop so that there is a minimum of shock, noise and wear; and wherein the cams and associated parts lie in a substantially single horizontal plane.

We claim:
1. In a tilting tray sorting conveyor, the combination comprising
   a track,
   a plurality of carriers on said track,
   a chain interconnecting said carriers and adapted to be driven to move said carriers along said track,
   each said carrier having a tray pivotally mounted thereon about an axis generally parallel to said track,
   each said carrier having a tilting yoke pivoted thereto about an axis generally normal to the direction of movement of said carrier,
   means connecting said yoke to said tray whereby when said yoke is pivoted in one direction said tray is swung to one side and when said yoke is pivoted in the opposite direction said tray is swung to the opposite side of the track,
   a pair of latch means on said carrier engaging said tilting yoke,
   each said latch means preventing movement of said yoke to a side of said track,
   and cam means mounted along each side of said track and adapted to engage one of said latch means for disengaging said latch means and moving said tray as the carrier moves along said track to tilt said tray to one side of said track.

2. The combination set forth in claim 1 including signal means on each said carrier and signal reader means adjacent said track and interconnecting said latch means for operating said latch means upon conditioning by said signal means on said carrier.

3. The combination set forth in claim 1 wherein said track means comprises
   a first running track, said carrier having guide means thereon engaging said
said carrier having wheels thereon engaging said first running track,
and a second guiding track vertically spaced beneath said first track,
second track.

4. In a tilting tray sorting conveyor, the combination comprising
   a running track,
   a plurality of carriers adapted to move along said running track,
   each said carrier comprising a frame,
   a stabilizing track extending along and beneath said running track,
   said frame having a stabilizing member projecting downwardly therefrom engaging said stabilizing track,
   a tray pivoted to each said carrier frame for swinging movement about a longitudinal axis generally parallel to the axis of said tracks for tilting to one side or the other of said track,
   a tilting yoke pivoted to said frame about a generally vertical axis,
   rod means interconnecting said yoke and said tray whereby when said yoke is pivoted in one direction said tray is swung to one side of said track and when said yoke is pivoted in the opposite direction said tray is tilted to the opposite side of said track,
   a latch lever pivoted on each side of said yoke about a generally vertical axis,
   a latch plate on said frame,
   each said latch lever having one end thereof adapted to engage said latch plate,
   spring means yieldingly urging said one end of said latch lever against said latch plate,
   each said latch lever having the other end thereof projecting outwardly relative to said yoke and having a cam follower thereon,
   a cam positioned along each side of said track and having portions thereof adapted to be moved into the path of said cam follower for engaging said cam follower,
   said cam having a curvature in a horizontal plane such that upon engagement of said cam follower with said cam and continued movement of the carrier, said latch lever is swung to disengage said one end of said latch lever from said latch plate and thereafter pivot said tilting yoke to swing said tray to one side of said track.

5. The combination set forth in claim 4 wherein said cam includes a first portion which is adapted to quickly disengage said latch lever and a second portion which is adapted to gradually accelerate and move said tray to a tilting position.

6. The combination set forth in claim 4 including lost motion means between said one end of each said latch lever and said tilting yoke.

7. In a tilting tray sorting conveyor, the combination comprising
   a track,
   a plurality of carriers on said track,
   a chain mounted for movement beneath said track interconnecting said carriers and adapted to be driven to move said carriers along said track,
   each said carrier having a generally horizontal tray pivotally mounted thereon above said track about an axis generally parallel to said track,
   each said carrier having a tilting yoke pivoted thereto beneath said tray about an axis generally normal to the direction of movement of said carrier,
   means connecting said yoke to said tray whereby when said yoke is pivoted in one direction said tray is swung to one side and when said yoke is pivoted in the opposite direction said tray is swung to the opposite side of the track,
   latch means mounted on each side of said yoke and engaging said carrier to prevent movement of said yoke to a side of said track,
   and cam means mounted along each side of said track and adapted to engage a corresponding latch means for disengaging said latch means and pivoting said yoke to move said tray as the carrier moves along said track tilting said tray to one side of said track.

8. The combination set forth in claim 7 including signal means on each said carrier and signal reader means adjacent said track and interconnecting said latch means for operating said latch means upon conditioning by said signal means on said carrier.

9. The combination set forth in claim 7 wherein said track means comprises
   a first running track,
   said carrier having wheels thereon engaging said first running track,
   and a second guiding track vertically spaced beneath said first track,
   said carrier having guide means thereon engaging said second track.

10. In a tilting tray sorting conveyor, the combination comprising
    a running track,
    a plurality of carriers adapted to move along said running track,
    each said carrier comprising a frame,
    a stablizing track extending along and beneath said running track,
    said frame having a stabilizing member projecting downwardly therefrom engaging said stabilizing track,
    a tray pivoted to each said carrier frame above said tracks for swinging movement about a longitudinal axis generally parallel to the axis of said tracks for tilting to one side or the other of said track,
    a tilting yoke pivoted within said frame about a generally vertical axis,
    rod means interconnecting said yoke and said tray whereby when said yoke is pivoted in one direction said tray is swung to one side of said track and when said yoke is pivoted in the opposite direction said tray is tilted to the opposite side of said track,
    a latch lever pivoted on each side of said yoke about a generally vertical axis,
    a latch plate on said frame,
    each said latch lever having one end thereof adapted to engage said latch plate,
    spring means yieldingly urging said one end of said latch lever against said latch plate,
    each said latch lever having the other end thereof projecting outwardly relative to said yoke and having a cam follower thereon,
    a cam positioned along each side of said track and having portions thereof adapted to be moved into the path of said cam follower for engaging said cam follower,
    said cam having a curvature in a horizontal plane such that upon engagement of said cam follower with said cam and continued movement of the carrier, said latch lever is swung to disengage said one end of said latch lever from said latch plate and thereafter pivot said tilting yoke to swing said tray to one side of said track.

11. The combination set forth in claim 10 wherein said cam includes a first portion which is adapted to quickly disengage said latch lever and a second portion which is adapted to gradually accelerate and move said tray to a tilting position.

12. The combination set forth in claim 11 including lost motion means between said one end of each said latch lever and said tilting yoke.

13. In a tilting tray sorting conveyor, the combination comprising
    a track,
    a plurality of carriers suspended from said track, a chain interconnecting said carriers and adapted to be driven to move said carriers along said track, each said carrier having a tray pivotally mounted thereon about an axis generally parallel to said track, each said carrier having a tilting yoke pivoted thereto below said tray about an axis generally normal to the direction of movement of said carrier, means connecting said yoke to said tray whereby when said yoke is pivoted in one direction said tray is swung to one side and when said yoke is pivoted in the opposite direction said tray is swung to the opposite side of the track, latch means mounted on each side of said yoke and engaging said carrier to prevent movement of said yoke to one side of said track, and cam means mounted along each side of said track and adapted to engage a corresponding latch means for disengaging said latch means and pivoting said yoke to move said tray as the carrier moves along said track tilting said tray to one side of said track.

14. The combination set forth in claim 13 wherein said track means comprises a first running track, said carrier having wheels thereon suspending said carrier from said first running track, and a second guiding track vertically spaced beneath said first track, said carrier having guide means thereon engaging said second track.

15. In a tilting tray sorting conveyor, the combination comprising a running track, a plurality of carriers suspended from said track for movement along said track, each said carrier comprising a frame, a stabilizing track extending along and beneath said running track, said frame having a stabilizing member projecting downwardly therefrom engaging said stablizing track, a tray pivoted on each said carrier frame for swinging movement about a longitudinal axis generally parallel to the axis of said tracks for tilting to one side or the other of said track, a tilting yoke pivoted to said frame within said frame about a generally vertical axis, rod means interconnecting said yoke and said tray whereby when said yoke is pivoted in one direction said tray is swung to one side of said track and when said yoke is pivoted in the opposite direction said tray is tilted to the opposite side of said track, a latch lever pivoted on each side of said yoke about a generally vertical axis, a latch plate on said frame, each said latch lever having one end thereof adapted to engage said latch plate, spring means yieldingly urging said one end of said latch lever against said latch plate, each said latch lever having the other end thereof projecting outwardly relative to said yoke and having a cam follower thereon, a cam positioned along each side of said track and having portions thereof adapted to be moved into the path of said cam follower for engaging said cam follower, said cam having a curvature in a horizontal plane such that upon engagement of said cam follower with said cam and continued movement of the carrier, said latch lever is swung to disengage said one end of said latch lever from said latch plate and thereafter pivot said tilting yoke to swing said tray to one side of said track.

16. In a tilting tray sorting conveyor, the combination comprising a track, a plurality of carriers on said track, a chain interconnecting said carriers and adapted to be driven to move said carriers along said track, each said carrier having a tray pivotally mounted thereon about an axis generally parallel to said track, each said carrier having a tilting yoke pivoted thereto about an axis generally normal to the direction of movement of said carrier, means connecting said yoke to said tray whereby when said yoke is pivoted said tray is swung to one side of said track, latch means on said carrier engaging said tilting yoke and preventing movement to one side of said track, and cam means mounted along each side of said track and adapted to engage one of said latch means for disengaging said latch means and moving said tray as the carrier moves along said track tilting said tray to one side of said track.

17. In a tilting tray sorting conveyor, the combination comprising a running track, a plurality of carriers adapted to move along said running track, each said carrier comprising a frame, a stabilizing track extending along and beneath said running track, said frame having a stabilizing member projecting downwardly therefrom engaging said stabilizing track, a tray pivoted to each said carrier frame for swinging movement about a longitudinal axis generally parallel to the axis of said tracks for tilting to one side of said track, a tilting yoke pivoted to said frame about a generally vertical axis, rod means interconnecting said yoke and said tray whereby when said yoke is pivoted said tray is swung to one side of said track, a latch lever pivoted on said yoke about a generally vertical axis, a latch plate on said frame, said latch lever having one end thereof adapted to engage said latch plate, spring means yieldingly urging said one end of said latch lever against said latch plate, said latch lever having the other end thereof projecting outwardly relative to said yoke and having a cam follower thereon, a cam positioned along each side of said track and having portions thereof adapted to be moved into the path of said cam follower for engaging said cam follower, said cam having a curvature in a horizontal plane such that upon engagement of said cam follower with said cam and continued movement of the carrier, said latch lever is swung to disengage said one end of said latch lever from said latch plate and thereafter pivot said tilting yoke to swing said tray to one side of said track.

18. The combination set forth in claim 17 wherein said cam includes a first portion which is adapted to quickly disengage said latch lever and a second portion which is adapted to gradually accelerate and move said tray to a tilting position and a third portion for gradually decelerating the tilting motion of the tray.

19. The combination set forth in claim 17 including lost motion means between said one end of each said latch lever and said tilting yoke.

No references cited.

EVON C. BLUNK, *Primary Examiner.*

R. J. HICKEY, *Assistant Examiner.*